United States Patent
Matsuno et al.

(10) Patent No.: US 7,040,953 B2
(45) Date of Patent: May 9, 2006

(54) SUBSTRATE FOR INFORMATION RECORDING MEDIA AND MANUFACTURING METHOD THEREOF, AND INFORMATION RECORDING MEDIUM

(75) Inventors: Kensuke Matsuno, Yokkaichi (JP); Takeo Watanabe, Sagamihara (JP); Junji Kurachi, Takarazuka (JP)

(73) Assignee: Hoya Corporation, Tokyo (JP)

( * ) Notice: Subject to any disclaimer, the term of this patent is extended or adjusted under 35 U.S.C. 154(b) by 179 days.

(21) Appl. No.: 10/205,073

(22) Filed: Jul. 25, 2002

(65) Prior Publication Data

US 2003/0109202 A1 Jun. 12, 2003

(30) Foreign Application Priority Data

Jul. 25, 2001 (JP) ........................... 2001-224545

(51) Int. Cl.
*B24B 1/00* (2006.01)
*C03C 19/00* (2006.01)

(52) U.S. Cl. ................. 451/5; 451/41; 451/28; 65/61

(58) Field of Classification Search .............. 451/5–10, 451/41, 28, 35; 65/30.14, 31, 61, 99.2; 428/64.3, 428/64.1, 410, 426
See application file for complete search history.

(56) References Cited

U.S. PATENT DOCUMENTS

| | | | | | |
|---|---|---|---|---|---|
| 5,413,620 | A | * | 5/1995 | Henry | 65/406 |
| 5,916,656 | A | * | 6/1999 | Kitayama et al. | 428/64.1 |
| 6,114,039 | A | * | 9/2000 | Rifqi | 428/410 |
| 6,595,028 | B1 | * | 7/2003 | Miyamoto et al. | 65/30.14 |
| 2001/0014573 | A1 | | 8/2001 | Shimoi et al. | |
| 2001/0055938 | A1 | * | 12/2001 | Fujimura et al. | 451/41 |
| 2002/0121110 | A1 | * | 9/2002 | Saito et al. | 65/30.14 |
| 2002/0157199 | A1 | * | 10/2002 | Piltingsrud | 15/77 |
| 2003/0121285 | A1 | * | 7/2003 | Kesuka et al. | 65/61 |

FOREIGN PATENT DOCUMENTS

| | | |
|---|---|---|
| JP | 64-42025 A | 2/1989 |
| JP | 7-134823 A | 5/1995 |
| JP | 7-182655 A | 7/1995 |
| JP | 7-296380 A | 11/1995 |
| JP | 8-249654 A | 9/1996 |
| JP | 9-194229 A | 7/1997 |
| JP | 2000-76652 A | 3/2000 |
| JP | 2000-128583 A | 5/2000 |
| JP | 2000-132829 A | 5/2000 |
| JP | 2000-207730 A | 7/2000 |

* cited by examiner

*Primary Examiner*—Lee D. Wilson
(74) *Attorney, Agent, or Firm*—Frishauf, Holtz, Goodman & Chick, P.C.

(57) ABSTRACT

There are provided a substrate for information recording media and a manufacturing method thereof, according to which the projection height of minute undulations formed on the substrate surfaces can be made more uniform, and variation in the projection density can be suppressed. First, chemical strengthening treatment is carried out on a glass substrate that has been prepared by processing a sheet-shaped starting material glass plate into a predetermined shape. Then, precision polishing is carried out on the glass substrate that has been subjected to the chemical strengthening treatment, such that a polishing amount in a thickness direction of the glass substrate is within a predetermined range. Finally, surface washing is carried out on the glass substrate that has been subjected to said precision polishing.

26 Claims, 7 Drawing Sheets

SUBSTRATE FOR INFORMATION RECORDING MEDIA AND MANUFACTURING METHOD THEREOF, AND INFORMATION RECORDING MEDIUM

BACKGROUND OF THE INVENTION

1. Field of the Invention

The present invention relates to a substrate for information recording media and a manufacturing method thereof, and an information recording medium, and more specifically to a substrate for information recording media for use as a disk substrate in a hard disk drive or the like and a manufacturing method thereof, and an information recording medium such as a magnetic disk, an optical magnetic disk or an optical disk.

2. Description of the Related Art

In recent years, there has been remarkable progress in information technology, and development of various types of information recording medium for storing information such as magnetic disks, optical magnetic disks and optical disks has been carried out with vigor.

In a hard disk drive (HDD), recording and playback of information are carried out by means of a magnetic head flying over a data zone formed on a magnetic disk substrate. Known driving methods used include a CSS (contact start/stop) method and a ramp load method.

In the CSS method, a CSS zone in which uniform minute undulations of height several tens of nm are formed is provided along the inner periphery or the outer periphery of the magnetic disk substrate. The magnetic head flies over the data zone of the magnetic disk substrate while the magnetic disk substrate is rotating, and slides over the CSS zone of the magnetic disk substrate when the magnetic disk substrate stops or starts up.

In the ramp load method, the magnetic head flies over the magnetic disk substrate while the magnetic disk substrate is rotating, and is stored in a predetermined storage position when the magnetic disk substrate stops.

In both the CSS method and the ramp load method, while the magnetic disk substrate is rotating, the magnetic head is thus raised up slightly from the magnetic disk substrate, and flies over the surface of the magnetic disk substrate with a gap (hereinafter referred to as the "flying height") of several tens of nm maintained between the magnetic head and the surface of the magnetic disk substrate.

In an HDD, it is necessary to prevent the magnetic head from being subjected to excessive resistance in the case that the magnetic head contacts the magnetic disk substrate while flying over the magnetic disk substrate. To this purpose, art in which a large number of minute projections referred to collectively as "texture" are formed on the surfaces of the magnetic disk substrate has been implemented from hitherto, and has been made fit for practical use.

Specifically, known art for forming a large number of minute undulations on the surfaces of a magnetic disk substrate includes art in which etching is carried out using a fluorine-containing liquid or hydrogen fluoride gas, thus forming a large number of minute undulations on a glass substrate (Japanese Laid-open Patent Publication (Kokai) No. 64-42025), art in which a glass substrate is subjected to crystallization treatment, then mirror-polishing is carried out, and then etching is carried out using a liquid prepared by adding sulfuric acid or ammonium fluoride to hydrofluoric acid, thus forming a large number of minute undulations on the glass substrate (Japanese Laid-open Patent Publication (Kokai) No. 7-296380), art in which ultrafine particles are applied onto a glass substrate, then dry etching is carried out, and then the ultrafine particles are removed, thus forming a large number of minute undulations on the glass substrate (Japanese Laid-open Patent Publication (Kokai) No. 8-249654), and art in which projections are formed on the surfaces of a glass substrate by irradiating with a laser beam (Japanese Laid-open Patent Publication (Kokai) No. 7-182655, Japanese Laid-open Patent Publication (Kokai) No. 9-194229).

With current demands to increase the recording density of HDDS, there have been demands to further reduce the flying height. To this purpose, it is necessary to reduce the projection height of the minute undulations formed on the surfaces of the glass substrate, and moreover to suppress variation in the projection density, thus enabling head crashes and thermal asperity to be avoided. Moreover, to cope with increases in the recording density, it is necessary to improve the degree of cleanliness of the surfaces of the glass substrate, and yet there have also come to be demands to manufacture glass disk substrates at a low cost about the same as that of conventional aluminum disk substrates.

Amid this situation, these days the manufacture of magnetic disk substrates is widely carried out by subjecting a glass substrate to precision polishing, then forming minute undulations on the surfaces of the glass substrate by carrying out etching, and then subjecting the glass substrate to chemical strengthening treatment.

FIG. 8 is a flowchart showing a conventional method of manufacturing a magnetic disk substrate (see, for example, Japanese Laid-open Patent Publication (Kokai) No. 2000-132829; hereinafter referred to as "the first prior art"). In the first prior art, a starting material glass plate that has been manufactured in a starting material glass plate manufacturing step 101 is cut into a donut shape in a disk processing step 102, then the inner and outer peripheral surfaces of the starting material glass plate are processed to predetermined dimensions in an edge processing step 103, next the surfaces of the resulting glass substrate are polished in a surface polishing step 104, then the surfaces of the glass substrate are washed using silicofluoric acid or the like and thus etched in a surface washing step 105, then the glass substrate is strengthened in a chemical strengthening treatment step 106, and then, in a finishing washing step 107, the glass substrate is washed by immersing in sulfuric acid heated to 40° C. while irradiating with ultrasound if necessary, thus etching the glass substrate and hence removing residual foreign matter such as iron powder stuck to the glass substrate. Through these steps, a magnetic disk substrate is manufactured.

In the surface polishing step 104, the polishing of the surfaces of the glass substrate is carried out in three steps, i.e. a rough polishing step 104a, a pre-polishing step 104b, and a precision polishing step 104c.

Moreover, as other prior art, a method of manufacturing a magnetic disk substrate is also known in which, after chemical strengthening treatment has been carried out on a glass substrate to form a strengthened layer, polishing is carried out on the main surfaces (recording surfaces) of the glass substrate, thus removing the strengthened layer from the main surfaces of the glass substrate while leaving the strengthened layer behind on only the inner and outer peripheral edge surfaces of the glass substrate (Japanese Patent Application Laid-open No. 2000-207730; hereinafter referred to as "the second prior art").

Furthermore, a method of manufacturing a magnetic disk substrate has also been proposed in which chemical strengthening treatment is carried out to form a strengthened layer of thickness at least 20 μm, preferably at least 50 μm, then at least 10 μm of the strengthened layer is polished away by precision polishing, resulting in a state in which at least 10 μm of the strengthened layer remains, and then de-alkalization treatment is carried out in this state (Japanese Patent Application Laid-open No. 2000-128583; hereinafter referred to as "the third prior art").

However, in the first prior art described above, even though the variation in the projection height of the minute undulations can be suppressed to be within a certain range through the etching in the surface washing step 105 after the precision polishing step 104c, the surface shape changes due to the subsequent chemical strengthening treatment step 106, and also changes due to the subsequent washing in the finishing washing step 107. There is thus a problem that the uniformity of the projection height of the minute undulations on the glass substrate is lost, and moreover the variation in the projection density increases. Specifically, in the chemical strengthening treatment step 106, compressive stress is imparted to the main surfaces of the glass substrate through ion exchange between $Na^+$ and $K^+$ in the molten salt, thus strengthening the substrate. However, due to disuniformity in the composition of the molten salt and degradation of the molten salt over time, the surface shape (minute undulations) changes when the compressive stress is imparted. Moreover, after the chemical strengthening treatment, compressed layers produced through the chemical strengthening treatment and compressed layers produced through the precision polishing 104c are intermixed on the substrate surfaces. In the finishing washing step 107, as described above the glass substrate is immersed in sulfuric acid heated to 40° C. to remove foreign matter by etching; however, at the compressed layers produced through the chemical strengthening treatment and the compressed layers produced through the precision polishing 104c, the degree of etching by the treatment liquid differs, and hence the surface shape changes between before and after the finishing washing step 107. There is thus a problem that, compared with the surface shape before the chemical strengthening treatment step 106, after the finishing washing step 107 the uniformity of the projection height of the minute undulations has been lost, and the variation in the projection density has increased, both across a single glass substrate, and between a plurality of glass substrates.

Moreover, in the second prior art, the strengthened layer formed on each of the main surfaces of the glass substrate is completely removed, and hence there is a problem that polishing scrap (i.e. matter removed from the glass substrate) produced through the polishing is discharged in a large amount, leading to an increase in the amount of industrial waste, and resulting in an increase in the manufacturing cost.

Moreover, in the third prior art, it is necessary to make at least 10 μm of the strengthened layer on each of the main surfaces of the glass substrate remain behind even after the main surfaces have been polished, and hence the starting material glass plate must be formed to be extra thick. Moreover a large amount of polishing scrap is discharged through the polishing, and hence, as with the second prior art, there is a problem that this leads to an increase in the amount of industrial waste, and results in an increase in the manufacturing cost.

SUMMARY OF THE INVENTION

It is an object of the present invention to provide a substrate for information recording media and a manufacturing method thereof, and an information recording medium, according to which the projection height of minute undulations formed on the substrate surfaces can be made more uniform, and variation in the projection density can be suppressed.

The present inventors carried out assiduous studies toward making the projection height of the minute undulations more uniform and suppressing variation in the projection density, and as a result discovered that by carrying out precision polishing after carrying out chemical strengthening treatment, and moreover carrying out etching in a state in which the strengthened layer formed through the chemical strengthening treatment still partially remains, a magnetic disk substrate can be obtained according to which variation in the projection density is suppressed and the projection height is more uniform.

That is, one might think that by carrying out precision polishing, then carrying out chemical strengthening treatment, and then carrying out surface washing using an etching liquid, a magnetic disk substrate could be manufactured having minute undulations with a uniform projection height and little variation in projection density.

However, the minute undulations are formed by pushing fine polishing abrasive grains against the substrate surfaces at high pressure during the precision polishing, thus forming highly densified compressed layers, and parts that have not been highly densified (which will be referred to as "uncompressed layers"), and then weakly etching the uncompressed layers, thus making the compressed layers into projecting shapes.

It was found that, in the case that the chemical strengthening treatment is carried out immediately after the precision polishing, the state of the compressed layers formed in the precision polishing changes through the compressive stress imparted in the chemical strengthening treatment, and hence even if etching is subsequently carried out, the desired minute undulations cannot be formed.

The present inventors thus carried out further assiduous studies, and as a result discovered that by carrying out surface polishing including precision polishing after chemical strengthening treatment, and then after that carrying out surface washing using an etching liquid, minute undulations with a uniform projection height and little variation in projection density can be formed on a glass substrate with good reproducibility. Furthermore, it was also discovered that, in the precision polishing after the chemical strengthening treatment, it is not necessary to completely remove the strengthened layer that was formed through the chemical strengthening treatment, but rather the uniformity of the projection height can be improved if the etching is carried out in a state in which the strengthened layer has been made to remain to some extent.

The present invention was achieved based on the above findings. A method of manufacturing a substrate for information recording media according to the present invention comprises the steps of carrying out chemical strengthening treatment on a glass substrate that has been prepared by processing a sheet-shaped starting material glass plate into a predetermined shape, carrying out precision polishing on the glass substrate that has been subjected to the chemical strengthening treatment, such that the polishing amount in the thickness direction of the glass substrate is within a predetermined range, and carrying out surface washing on the glass substrate that has been subjected to the precision polishing.

Moreover, to prevent minute scratches from being formed on the surfaces of the starting material glass plate, but also avoid the polishing rate dropping, it is preferable to use a polishing agent having a mean grain diameter in a range of 0.1 µm to 1.7 µm in the precision polishing.

Moreover, in the precision polishing, to eliminate variation in the average surface roughness and remove minute scratches, it is preferable for the polishing amount to be not less than 1 µm, more preferably not less than 3 µm. On the other hand, considering the manufacturing cost and so on, it is preferable for the polishing amount to be not more than 75 µm, more preferably not more than 25 µm.

Moreover, in the surface washing, by carrying out acid washing using an acidic aqueous solution, the uncompressed layers that have been given a lower compressive stress than the compressed layers are selectively etched, and hence minute projections are formed on the substrate surfaces.

Nevertheless, to form minute projections having a uniform projection height and a uniform projection density on the glass substrate, it is necessary to carry out the precision polishing using fine polishing abrasive grains as described above, so that minute scratches are not formed on the glass substrate. As a result, the compressed layers formed on the substrate surfaces through the precision polishing are very thin. Consequently, if a chemical having a high etching power is used in the acid washing, then a large amount of etching will take place, and hence the difference between the compressed layers that have been given a high compressive stress and the uncompressed layers that have been given a lower compressive stress will be lost, and as a result it will no longer be possible to form the desired minute undulations. It is thus necessary to select an acidic aqueous solution having a suitable or moderate etching power in the surface washing. From this viewpoint, it is preferable to use hydrofluoric acid, sulfuric acid, sulfamic acid, hydrochloric acid, nitric acid, or phosphoric acid (or a mixture of a plurality thereof).

Moreover, in the case that the glass substrate is etched using an acidic aqueous solution as described above, some of the components that constitute the glass substrate leach out into the acidic aqueous solution, and hence a thin altered layer that is soft and has a low mechanical strength is formed on the substrate surfaces. Moreover, in the case that the surface washing is carried out using only an acidic aqueous solution, in the acidic aqueous solution the glass substrate becomes negatively charged whereas foreign matter such as polishing abrasive grains becomes positively charged, and as a result the foreign matter attaches to the glass substrate through electrostatic forces.

However, in an alkaline aqueous solution, both the glass substrate and the foreign matter become negatively charged and thus repel one another, and hence attachment of the foreign matter to the glass substrate can be prevented. Moreover, in the case that alkali washing is carried out using an alkaline aqueous solution having a pH of not less than 10, the altered layer that was formed in the acid washing is virtually completely removed by etching, and hence foreign matter can be eliminated virtually completely, and thus the degree of cleanliness of the surfaces of the glass substrate can be improved.

Consequently, in the surface washing in the present invention, it is preferable to carry out acid washing using an acidic aqueous solution, specifically an acidic aqueous solution containing at least one acid selected from the group consisting of hydrofluoric acid, sulfuric acid, sulfamic acid, hydrochloric acid, nitric acid, and phosphoric acid, and then carry out alkali washing using an alkaline aqueous solution having a pH of not less than 10, specifically an alkaline aqueous solution containing at least one alkali selected from the group consisting of potassium hydroxide, sodium hydroxide, ammonia, and tetramethylammonium hydroxide.

Moving on, the migration speed in the glass substrate of $K^+$, which is made to replace $Na^+$ in the glass by ion exchange during the chemical strengthening treatment, is low, and hence ion exchange with moisture in the air occurs with difficulty, resulting in the strengthened layer formed through the chemical strengthening treatment acting to improve the weather resistance. However, in the present invention, precision polishing is carried out after the chemical strengthening treatment as described above, and hence the outermost part of the strengthened layer is removed, which may lead to a drop in the weather resistance.

The present inventors thus carried out assiduous studies toward improving the weather resistance, and as a result discovered that by carrying out de-alkalization treatment after carrying out the surface washing, the weather resistance can be improved. Moreover, it was found that, in this case, if a strongly alkaline aqueous solution is used, then the de-alkalization cannot be carried out sufficiently, and hence it is necessary to use a high-temperature solution (for example, 70° C. or above) having a pH of not more than 11, and to make the treatment time at least 5 minutes.

In the present invention, it is thus preferable to carry out de-alkalization treatment after carrying out the alkali washing. Moreover, it is preferable to use a high-temperature solution of pH not more than 11 in the de-alkalization treatment, it is preferable for the temperature of the high-temperature solution to be not less than 70° C., and it is preferable for the de-alkalization treatment to be carried out for a time period of not less than 5 minutes.

Moreover, the de-alkalization treatment may also be carried out using a high-temperature acidic gas, whereby an effect similar to that described above can be obtained.

Moreover, it was found that if scrub washing is carried out using fine polishing abrasive grains such as colloidal silica after the precision polishing but before the surface washing, then the surfaces of the glass substrate become extremely flat, and projections that would act as nuclei for crystallization of alkaline components that have been educed to the surfaces of the glass substrate are not produced, and hence even if alkaline components are educed to the surfaces of the glass substrate, projections that would cause thermal asperity are not formed.

In the present invention, it is thus preferable to carry out scrub washing using polishing abrasive grains between the precision polishing and the surface washing, and moreover it is preferable for the polishing abrasive grains to comprise a colloidal silica slurry.

Moreover, a substrate for information recording media according to the present invention is manufactured using a manufacturing method as described above, and has an average surface roughness Ra in a range of 0.1 nm to 1.5 nm, and a bearing height BH04 in a range of 0.5 nm to 5 nm.

If the proportion (bearing ratio) of a portion of a slicing plane occupied by the cross sections of projections on the magnetic disk substrate surface, the slicing plane being a plane along which the magnetic disk substrate surface is sliced, is 50%, and this slicing plane is taken as a reference plane, the "bearing height BH04" is the distance from the reference plane to a slicing plane at which the bearing ratio is 0.4%.

The surface shape of substrate surfaces is generally evaluated using the average surface roughness Ra (JIS B0601), but due to the distinctive nature of the calculation method, the average surface roughness Ra will be low if the number of projections is low even if there are some high projections, and moreover will be high if there are a large number of small projections even if there are no high projections. It is thus inadequate to carry out an evaluation of abnormal projections using only the average surface roughness Ra.

In the present invention, the bearing height BH04 has thus been taken as an evaluation criterion in addition to the average surface roughness Ra.

Specifically, the substrate for information recording media according to the present invention is made to have an average surface roughness Ra in a range of 0.1 nm to 1.5 nm and a bearing height BH04 in a range of 0.5 nm to 5 nm as measured using an atomic force microscope (AFM). As a result, the flying height can be reduced, stable flying of the magnetic head can be secured, and the occurrence of head crashes and thermal asperity can be prevented.

Moreover, an information recording medium according to the present invention comprises a substrate for information recording media as described above, and an information recording layer formed on at least one surface thereof.

According to this constitution, an information recording medium that has extremely good flatness and thus enables the data zone recording density to be increased can be obtained easily.

The above and other objects, features and advantages of the invention will become more apparent from the following detailed description taken in conjunction with the accompanying drawings.

BRIEF DESCRIPTION OF THE DRAWINGS

FIG. 2A shows the undulations on the magnetic disk substrate surface;

FIG. 2B is a sectional view taken along line A—A in FIG. 2A; and

FIG. 2C is a sectional view taken along line B—B in FIG. 2A;

DETAILED DESCRIPTION OF THE PREFERRED EMBODIMENTS

Embodiments of the present invention will now be described in detail with reference to the drawings.

Figure 1:
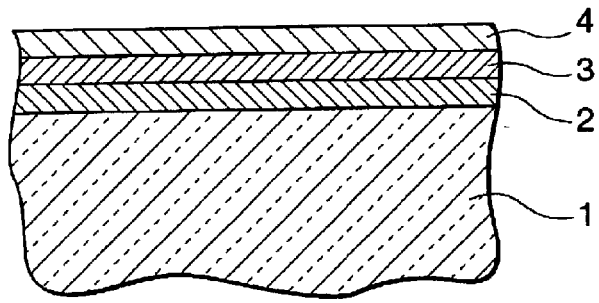
FIG. 1 is a schematic sectional view showing a magnetic disk, which is an information recording medium according to an embodiment of the present invention.

FIG. 1 is a schematic sectional view showing a magnetic disk, which is an information recording medium according to an embodiment of the present invention. The magnetic disk is comprised of a magnetic disk substrate 1 having a foundation layer 2, a magnetic layer 3 and a protective layer 4 formed in this order on a surface thereof using a known sputtering method.

CrMo, Cr, CrV or the like can be used as the material of the foundation layer 2, and a cobalt alloy such as CoPtCr or CoPtCrTa that enables excellent information recording/ playback characteristics and film adhesion to be secured can be used as the material of the magnetic layer 3. A carbon material such as hydrogenated carbon can be used as the material of the protective layer 4.

The magnetic disk substrate 1 is manufactured using a manufacturing method that will be described later. The average surface roughness Ra of the magnetic disk substrate 1 is made to be in a range of 0.1 nm to 1.5 nm, and the bearing height BH04 in a range of 0.5 nm to 5 nm. As a result, stable flying with no head crashes or thermal asperity becomes possible even if the flying height is reduced.

Specifically, to reduce the flying height while continuing to secure stable flying of the magnetic head, it is necessary to prevent the occurrence of abnormal projections as described above. First, it is thus necessary to evaluate the surface shape of the magnetic disk substrate through the average surface roughness Ra (using an atomic force microscope). In the present embodiment, the average surface roughness Ra is set to be in a range of 0.1 nm to 1.5 nm.

If the average surface roughness Ra exceeds 1.5 nm, then the smoothness of the substrate surfaces will be lost, and hence there will be a risk of the magnetic head flying over the magnetic disk substrate colliding with the substrate, leading to head crashes and/or thermal asperity. On the other hand, considering the manufacturing cost and so on, it is difficult to mass-produce magnetic disk substrates having an average surface roughness Ra of less than 0.1 nm.

In the present embodiment, first, the average surface roughness Ra was thus set to be in a range of 0.1 nm to 1.5 nm.

The average surface roughness Ra is calculated as the integral mean value of the roughness curve obtained by cutting off surface waviness components of wavelength longer than a predetermined wavelength from a profile curve of the article being subjected to the measurement (in the present embodiment, the magnetic disk substrate).

According to the conventional method of calculating the average surface roughness Ra, Ra will be low if the number of projections is low even if there are some high projections, and moreover Ra will be high if there are a large number of small projections even if there are no high projections. If the surface shape of the magnetic disk substrate is evaluated using the average surface roughness Ra, then even if there are high projections and hence there is a risk of head crashes and thermal asperity occurring, the average surface roughness Ra may thus still be within a permissible range. Shape evaluation of the magnetic disk substrate 1 thus cannot be carried out to high precision using only the average surface roughness Ra.

In the present embodiment, the concept of bearing height BH is thus introduced, and shape evaluation of the magnetic disk substrate is carried out using the bearing height BH as well as the average surface roughness Ra.

The bearing height will now be described with reference to FIGS. 2A to 2C.

Figure 2A:
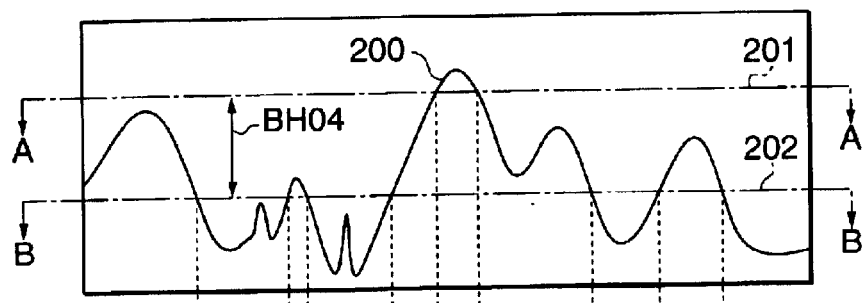
FIGS. 2A to 2C are conceptual drawings of undulations on a surface of a magnetic disk substrate 1 that has been subjected to texturing; specifically.
Figure 2B:
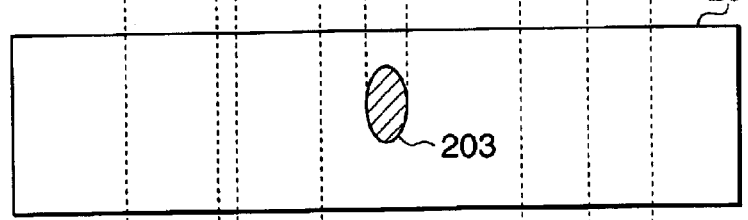
Figure 2C:
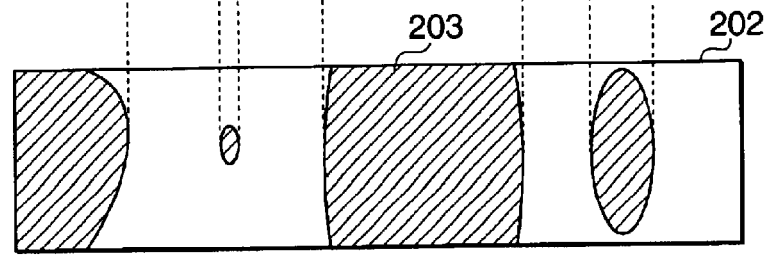

FIGS. 2A to 2C are conceptual drawings of undulations on a surface of a magnetic disk substrate 1 that has been textured. FIG. 2A shows the undulations on the magnetic disk substrate surface, FIG. 2B is a sectional view taken along line A—A in FIG. 2A, and FIG. 2C is a sectional view taken along line B—B in FIG. 2A.

In FIGS. 2A to 2C, reference numeral 200 indicates the surface undulations on the magnetic disk substrate 1, reference numeral 201 indicates a slicing plane at which the bearing ratio is 0.4%, reference numeral 202 indicates a slicing plane at which the bearing ratio is 50% (reference plane), and reference numeral 203 indicates the cross section of a surface projection on the magnetic disk substrate 1 at a slicing plane.

With the bearing height, only the projections on the surface of the magnetic disk substrate are focused upon, and using a criterion for evaluating the shape of the projections, the undulations on the surface of the magnetic disk substrate are evaluated. Specifically, the height at which the contact ratio of the undulations on the surface of the magnetic disk substrate is 50% is taken as a reference height, and the bearing height BH04, which is the distance from the reference height up to a height at which the contact ratio is 0.4%, is taken as the evaluation criterion. Here, the contact ratio is a value represented by the bearing ratio, and is measured using an atomic force microscope (AFM). The bearing ratio is the proportion of a portion of a slicing plane occupied by the cross sections of projections on the magnetic disk substrate surface, the slicing plane being a plane along which the magnetic disk substrate surface is sliced. For example, when the contact ratio (bearing ratio) is 50%, the cross sections of projections occupy half of the slicing plane (see FIG. 2C). The slicing plane at which the contact ratio is 50% is taken as a reference plane. As the slicing plane is shifted from the reference plane parallelly toward the tips of the projections, the contact ratio becomes progressively smaller. The distance from the reference plane up until the contact ratio becomes 0.4% (see FIG. 2B) is BH04.

In the present embodiment, BH04 is set to be in a range of 0.5 nm to 5 nm.

The reasons for this are that, in the case that BH04 is less than 0.5 nm, the flight stability of the magnetic head drops abruptly, and hence head crashes and thermal asperity become prone to occur. On the other hand, if BH04 exceeds 5 nm, then the probability of the magnetic head colliding with projections in the case that the flying height is made low increases, and hence head crashes and thermal asperity again become prone to occur. In the present embodiment, considering demands to reduce the flying height, BH04 has thus been set to be in a range of 0.5 nm to 5 nm.

Note that, considering the mechanism by which head crashes and thermal asperity occur, the larger the bearing height BH used (i.e. the smaller the bearing ratio BR for the bearing height BH used), the higher the precision with which the evaluation can be carried out, but if the bearing height BH used is made too large (i.e. the bearing ratio BR for the bearing height BH used is made too small) then a noise factor that does not affect head crashes and so on will be emphasized, and hence the sensitivity will worsen. In the present embodiment, it was thus decided to carry out the evaluation using BH04 (the distance in the height direction from where the bearing ratio BR is 50% to where the bearing ratio BR is 0.4%) as the bearing height BH.

As described above, according to the present embodiment, by making BH04 be in a range of 0.5 nm to 5 nm, a magnetic disk substrate 1 can be obtained that enables the flying height to be reduced without head crashes or thermal asperity occurring.

A method of manufacturing the magnetic disk substrate 1 will now be described in detail.

Figure 3:
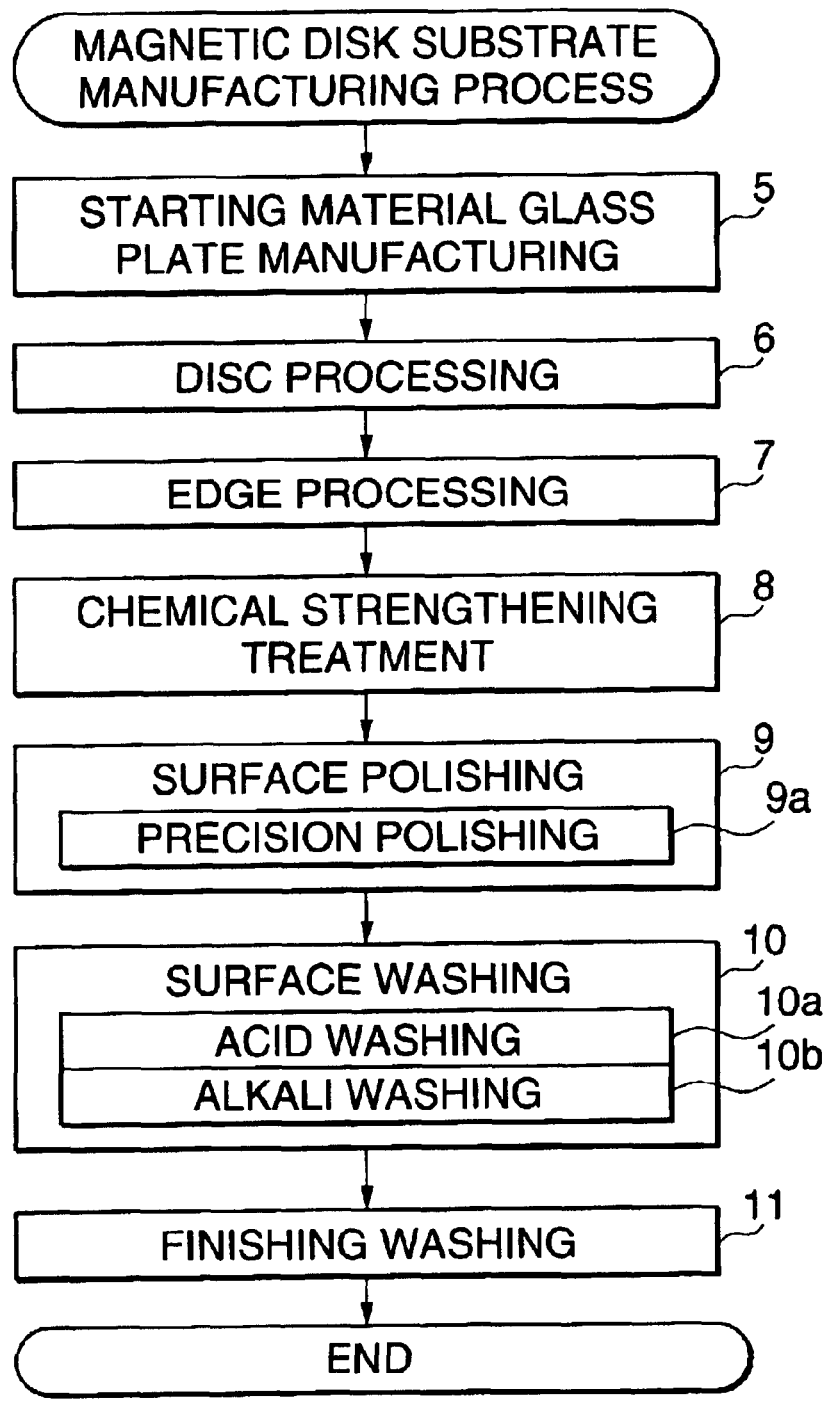
FIG. 3 is a flowchart showing a method of manufacturing a magnetic disk substrate 1 according to a first embodiment of the present invention.

FIG. 3 is a flowchart showing a method of manufacturing the magnetic disk substrate 1 according to a first embodiment of the present invention. The magnetic disk substrate 1 is manufactured through a starting material glass plate manufacturing step 5 in which a starting material glass plate is obtained through a predetermined manufacturing method, a disk processing step 6, an edge processing step 7, a chemical strengthening treatment step 8, a surface polishing step 9, a surface washing step 10, and a finishing washing step 11, carried out in this order.

There are no particular limitations on the glass materials. For example, a soda lime glass having $SiO_2$, $Na_2O$ and $CaO$ as principal components thereof, an aluminosilicate glass having $SiO_2$, $Al_2O_3$ and $R_2O$ (wherein R=K, Na, Li) as principal components thereof, an $Li_2O$—$SiO_2$ glass, an $Li_2O$—$Al_2O_3$—$SiO_2$ glass, or an $R'O$—$Al_2O_3$—$SiO_2$ glass (wherein R'=Mg, Ca, Sr or Ba) can be used. Moreover, a glass for glass strengthening in which $ZrO_2$, $TiO_2$ or the like has been added to glass materials as above can be used.

Descriptions will now be given of the various steps mentioned above, in the order in which they are carried out.

(1) Starting Material Glass Plate Manufacturing Step 5

In the starting material glass plate manufacturing step 5, a starting material glass plate is manufactured using a float process in which the starting material glass plate is manufactured from a glass ribbon in a predetermined high-temperature state that is formed by making the glass raw materials flow over molten tin, or a down draw method in which the starting material glass plate is manufactured from a glass ribbon that is formed by gravity from molten glass that flows out downwards from a working bath.

(2) Disk Processing Step 6

In the disk processing step 6, the starting material glass plate is cut simultaneously along an outer peripheral surface and an inner peripheral surface thereof using a hard metal cutter or a diamond cutter, thus making the starting material glass plate into a donut shape having predetermined inside and outside diameters and having excellent concentricity between the inner and outer peripheral surfaces.

It should be noted that, although in the present embodiment the inner and outer peripheral surfaces are cut simultaneously, it is also possible to first cut the outer peripheral surface to the predetermined outside diameter and then bore a hole to the predetermined inside diameter using a cylindrical diamond grindstone, or to press the starting material glass plate out into a disk shape having the predetermined outside diameter and then bore a hole to the predetermined inside diameter using a cylindrical diamond grindstone.

(3) Edge Processing Step 7

In the edge processing step 7, the edge surfaces (i.e. the inner and outer peripheral surfaces) of the donut-shaped starting material glass plate are ground and polished so that the inside and outside diameters of the donut-shaped starting material glass plate become the desired inside and outside diameters for the product magnetic disk substrate 1, thus manufacturing a glass substrate. Specifically, grinding of the inner and outer peripheral surfaces is carried out in two stages using grindstones having diamond abrasive grains attached thereto, with the grain size of the diamond abrasive grains being different in the two stages, and then chamfering of angular parts of the inner and outer peripheral surfaces is carried out.

The grain size of the diamond abrasive grains used is set as appropriate to be the most suitable in accordance with the required product quality. Moreover, it goes without saying that if, in the disk processing step 6 described above, the disk processing has been carried out such that the starting material glass plate already has inside and outside diameters close to the desired inside and outside diameters for the product magnetic disk substrate 1, then it may not be necessary to carry out the grinding in two stages, but rather one stage may suffice.

After the grinding, the inner and outer peripheral surfaces (including the chamfered parts; likewise hereinafter) are smoothed by polishing using $CeO_2$ (cerium oxide) loose abrasive grains, so that the average surface roughness Ra of the inner and outer peripheral surfaces becomes a predetermined value or less.

(4) Chemical Strengthening Treatment Step 8

In the chemical strengthening treatment step 8, the glass substrate is immersed for a predetermined time period in a molten salt, for example a mixed molten salt of potassium nitrate ($KNO_3$) and sodium nitrate ($NaNO_3$), that has been adjusted to a predetermined temperature, thus carrying out chemical strengthening treatment in which $Li^+$ and $Na^+$ in the chemical components of the glass substrate are exchanged respectively with $Na_+$ and $K^+$, which have a higher ionic radius than $Li^+$ and $Na^+$ respectively. By carrying out such chemical strengthening treatment, the surface compressive stress is raised, and hence the magnetic disk manufactured from the glass substrate can be prevented from breaking when rotated at high speed.

After the immersion in the molten salt, the glass substrate is slowly cooled down to a temperature close to room temperature, and then molten salt attached to the glass substrate is washed off in warm pure water.

(5) Surface Polishing Step 9

In the surface polishing step 9, precision polishing 9a is carried out on the surfaces of the glass substrate, while feeding onto these surfaces a polishing agent prepared by dispersing loose abrasive grains having a mean grain diameter in a range of 0.1 μm to 1.7 μm (ultra-fine abrasive grains) in a polishing liquid, and applying a predetermined load to the surfaces of the glass substrate. As a result, layers in which compressed layers and uncompressed layers are intermixed are formed on the substrate surfaces.

The reasons for limiting the grain diameter of the loose abrasive grains as above are as follows.

If the mean grain diameter exceeds 1.7 μm, then the grain diameter of the loose abrasive grains as a whole will be large, and hence the surfaces of the glass substrate will become prone to being scratched by the loose abrasive grains. On the other hand, if the mean grain diameter is less than 0.1 μm, then the grain diameter of the loose abrasive grains will be small, and hence the time required for the polishing will become long, and thus the productivity will drop.

In the present embodiment, the precision polishing step 9a is thus carried out using loose abrasive grains having a mean grain diameter in a range of 0.1 μm to 1.7 μm. As a result, layers are formed on the substrate surfaces in which compressed layers, where loose abrasive grains have been pushed strongly against the surface during the polishing, and uncompressed layers, where loose abrasive grains have not been pushed so strongly against the surface, are intermixed in an irregular fashion.

Moreover, in the precision polishing step 9a, the polishing amount is made to be in a range of 1 μm to 75 μm, preferably 3 μm to 25 μm (i.e. such that 1 μm to 75 μm, preferably 3 μm to 25 μm, of glass is removed from each of the surfaces of the glass substrate in the depth direction). If the polishing amount is less than 1 μm, then, because the polishing amount is too low, and moreover, in the case that the starting material glass plate was manufactured by the float process, because tin will be attached to the lower surface, after the surface washing, described later, has been carried out, the difference in the average surface roughness Ra between the upper surface, on which tin will not have been attached, and the lower surface will be large. It is thus necessary to make the polishing amount at least 1 μm. Moreover considering variation between substrates in the case that batch processing is carried out in which 50 to 100 substrates are polished at a time, it is preferable to make the polishing amount at least 3 μm.

On the other hand, if the polishing amount exceeds 25 μm, then the polishing will be carried out to an excessive extent, and hence a large amount of polishing scrap will be generated, i.e. more industrial waste will be discharged than is necessary. Moreover, in general the polishing rate is about 0.5 to 0.7 μm/min, and hence if the polishing amount exceeds 25 μm, then the polishing will require a long time, resulting in a drop in productivity. In particular, if the polishing amount exceeds 75 82 m, then the strengthened layer (which was formed through the chemical strengthening treatment) on each of the recording surfaces of the magnetic disk substrate 1 will become thin, and there will be a risk of this resulting in the substrate strength dropping. In the present embodiment, the polishing amount in the precision polishing step 9a is thus made to be in a range of 1 μm to 75 μm, preferably 3 μm to 25 μm.

There are no particular limitations on the type of the loose abrasive grains; for example, it is possible to use a rare earth oxide such as $CeO_2$ or $La_2O_3$, or else $ZrO_2$, $MnO_2$, $Al_2O_3$, $SiO_2$ (colloidal silica) or the like. However, from the viewpoint of obtaining a good polishing efficiency, it is preferable to use rare earth oxide abrasive grains, in particular $CeO_2$ abrasive grains.

Moreover, there are no particular limitations on the polishing pads used in the polishing; for example, nonwoven cloth polishing pads or foam polishing pads can be used. However, from the viewpoint of preventing the formation of scratches on the glass substrate, it is preferable to use suede pads formed from a base layer and a NAP layer, where the NAP layer is comprised of an open-cell foam layer finished so as to form openings in the surface thereof.

(6) Surface Washing Step 10

In the surface washing step 10, an acid washing step 10a and an alkali washing step 10b are carried out.

First, in the acid washing step 10a, etching is carried out using an acidic aqueous solution.

At the compressed layers formed through the precision polishing step 9a, densified $SiO_2$ impedes the leaching out of other components, resulting in the etching by the acidic aqueous solution occurring only with difficulty. There is thus a marked difference in the etching rate between the compressed layers and the uncompressed layers. Specifically, the etching rate is slower at the compressed layers than at the uncompressed layers, and hence a large number of minute projections are formed on each of the surfaces of the glass substrate in the positions of the compressed layers.

There are no particular limitations on the acidic aqueous solution, but hydrofluoric acid, sulfuric acid, sulfamic acid, hydrochloric acid, nitric acid or phosphoric acid is preferable in view of promoting the desired etching on the surfaces of the glass substrate.

Next, after the acid washing step 10a has been completed, the alkali washing step 10b is carried out. The reason for carrying out alkali washing is as follows. Through the acid washing step 10a, minute projections having a large projection height are formed in places where large, deep impressions were formed during the polishing, and minute projections having a small projection height are formed in places where the impressions are only small or shallow. In addition, when surface treatment is carried out using an acidic etching liquid as described above, an $SiO_2$-rich component is leached out, and as a result a thin altered layer that is soft and has a low mechanical strength is formed on each of the surfaces of the glass substrate.

In the case that the surface washing were carried out using only an acidic aqueous solution, because the glass substrate becomes negatively charged in an acidic aqueous solution whereas foreign matter such as polishing abrasive grains becomes positively charged, the foreign matter would reattach to the glass substrate through electrostatic forces, resulting in it being difficult to remove the foreign matter. In an alkaline aqueous solution, on the other hand, both the glass substrate and the foreign matter become negatively charged, and hence the two repel one another. As a result, reattachment of the foreign matter to the glass substrate can be prevented effectively. Moreover, by carrying out alkali washing using an alkaline aqueous solution, the altered layer that was formed in the acid washing step 10a is removed by etching, and hence the surface layer is hardened.

Here, there are no particular limitations on the type of the alkaline aqueous solution, but to remove the altered layer completely in a short time and with good efficiency, it is preferable for the alkaline aqueous solution to have a pH of not less than 10. Specifically, potassium hydroxide, sodium hydroxide, ammonia or tetramethylammonium hydroxide can be used.

It should be noted that in the case that only the alkali washing step 10b were carried out with the acid washing step 10a not being carried out, because the etching power of the alkaline aqueous solution is low, it would only be possible to carry out a very little etching. To avoid there being an altered layer on the surfaces of the glass substrate and prevent foreign matter from attaching to the glass substrate, it is thus necessary to carry out the acid washing step 10a, and then carry out the alkali washing step 10b, as described above.

(7) Finishing Washing Step 11

In the finishing washing step 11, washing is carried out by immersing the glass substrate in pure water, while irradiating with ultrasound if necessary, thus removing foreign matter or impurities such as polishing agent stuck to the surfaces of the glass substrate and molten salt that became attached to the surfaces of the glass substrate during the chemical strengthening treatment. Drying is then carried out using isopropyl alcohol (IPA), thus completing the manufacturing process.

Through the above process, the magnetic disk substrate 1 is manufactured as a product.

Figure 4:
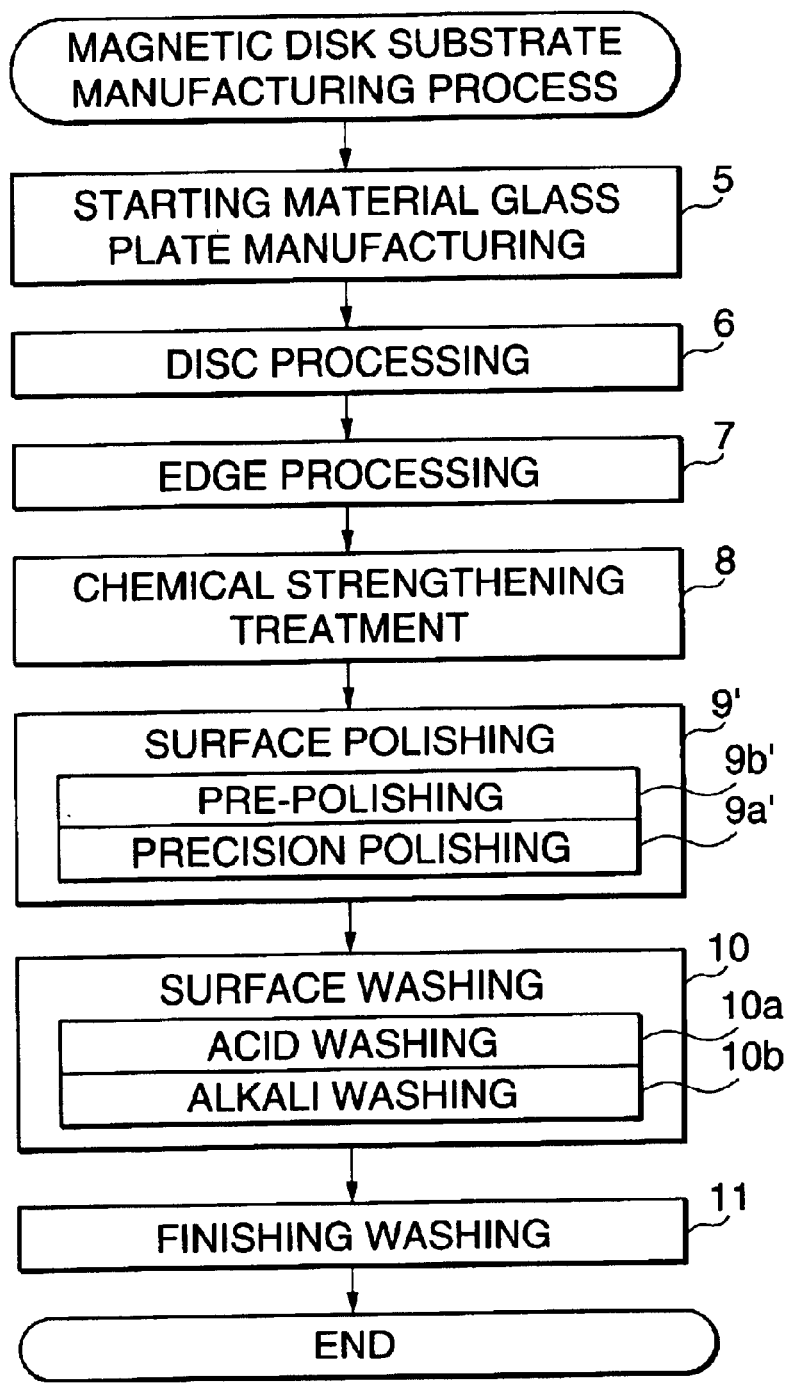
FIG. 4 shows a modification of the method of manufacturing the magnetic disk substrate 1 according to the first embodiment.

FIG. 4 shows a modification of the method of manufacturing the magnetic disk substrate 1 according to the first embodiment. In this modification, in the surface polishing step 9', a pre-polishing step 9b' is carried out before the precision polishing step 9a', thus further reducing the time required for the surface polishing step 9'.

Specifically, in the pre-polishing step 9b', pre-polishing is carried out using loose abrasive grains (fine abrasive grains) having a grain diameter larger than the loose abrasive grains used in the precision polishing step 9a'. As a result, the time required for the surface polishing can be reduced, and hence the productivity of manufacturing a magnetic disk substrate 1 having high product quality and excellent reliability can be improved.

Figure 5:
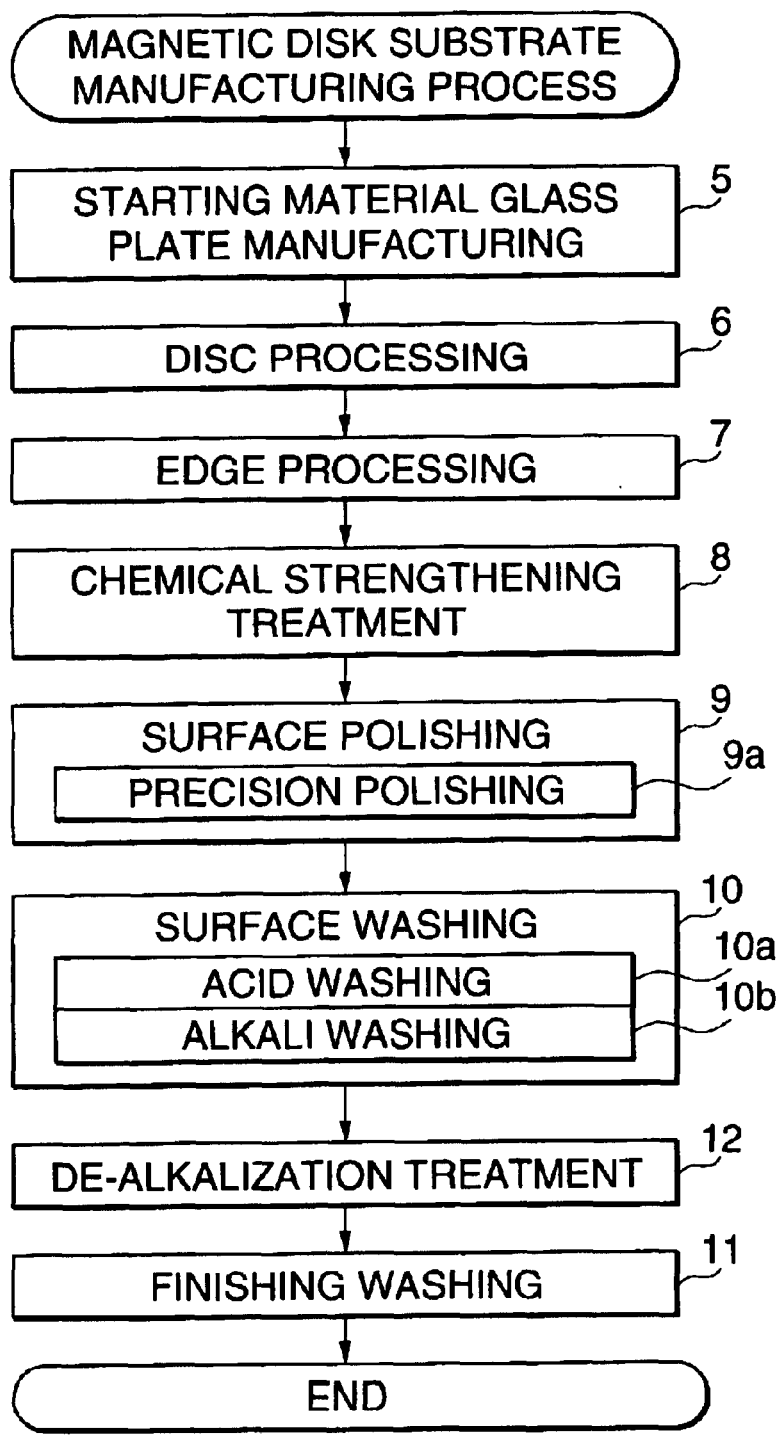
FIG. 5 is a flowchart showing a method of manufacturing the magnetic disk substrate 1 according to a second embodiment of the present invention.

FIG. 5 is a flowchart showing a method of manufacturing the magnetic disk substrate 1 according to a second embodiment of the present invention. In the second embodiment, a de-alkalization treatment step 12 is inserted between the surface washing step 10 and the finishing washing step 11. As a result, the weather resistance can be improved.

Specifically, for the glass substrate in which $Li^+$ and $Na^+$ have been exchanged respectively with $Na^+$ and $K^+$, which have a higher ionic radius than $Li^+$ and $Na^+$ respectively, in the chemical strengthening treatment step 8, the migration speed of the alkali metal ions at the glass substrate surfaces is low, and hence ion exchange with moisture in the air occurs with difficulty, resulting in the strengthened layer formed through the chemical strengthening treatment acting to improve the weather resistance. However, when polishing is carried out after the chemical strengthening treatment, the strengthened layer is removed, and hence the weather resistance deteriorates.

In the second embodiment, a de-alkalization treatment step 12 is thus carried out for at least 5 minutes using an acidic gas (for example, a mixture of nitrogen and sulfur dioxide) or a high-temperature solution having a temperature of not less than 70° C. and a pH of not more than 11. As a result, the amount of alkaline components at the glass substrate surfaces is reduced, and hence eduction of alkaline substances to the surfaces is prevented, and thus the weather resistance is improved.

The reason for using a high-temperature solution having a pH of not more than 11 in the de-alkalization treatment step 12 is that in the case that the pH is more than 11, the alkalinity is too high and hence the de-alkalization treatment cannot be carried out sufficiently. Moreover, the reason for carrying out the treatment for at least 5 minutes and making the temperature of the high-temperature solution be not less than 70° C. is that at less than 70° C. it will not be possible to carry out the de-alkalization treatment sufficiently even if the treatment time is made to be 5 minutes or more, and moreover if the treatment time is less than 5 minutes then the treatment time will be too short and hence it will not be possible to carry out the de-alkalization treatment sufficiently even if the temperature is 70° C. or more; in either case, alkaline substances will be leached out to the surfaces if the substrate is left for a long time, and hence it will not be possible to obtain the desired weather resistance.

Figure 6:
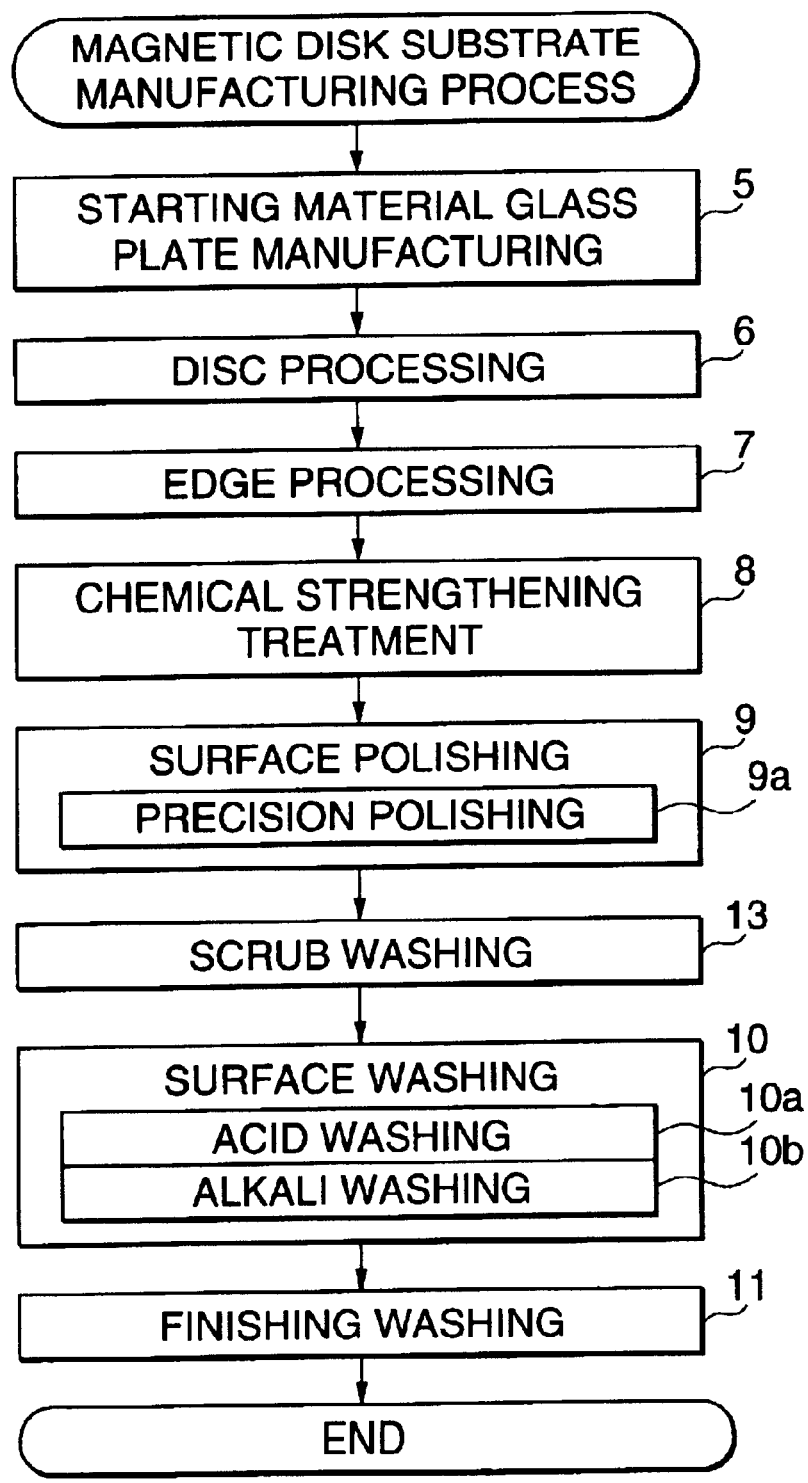
FIG. 6 is a flowchart showing a method of manufacturing the magnetic disk substrate 1 according to a third embodiment of the present invention.

FIG. 6 is a flowchart showing a method of manufacturing the magnetic disk substrate 1 according to a third embodiment of the present invention. In the third embodiment, a scrub washing step 13 is inserted between the surface polishing step 9 and the surface washing step 10. In the scrub washing step 13, scrub washing is carried out using a fine polishing agent such as a colloidal silica slurry, thus improving the flatness of the magnetic disk substrate 1.

By carrying out scrub washing on the main surfaces (recording surfaces) of the glass substrate using a fine polishing agent such as a colloidal silica slurry and thus improving the flatness of the glass substrate, projections that would act as nuclei for crystallization of alkaline substances that have been educed to the surfaces of the glass substrate are not produced, and hence even if alkaline substances are educed to the surfaces of the glass substrate, projections that would cause thermal asperity are not formed. Stable flying even at a low flying height of 10 nm or less thus becomes possible.

EXAMPLES

A description will now be given of specific examples of the present invention.

First Examples

Magnetic disk substrates were prepared varying the polishing amount in the precision polishing, and surface properties of the magnetic disk substrates were evaluated.

Specifically, first, 20 starting material glass plates of thickness 0.685 mm were obtained from an aluminosilicate glass material having a composition of 65 mass % $SiO_2$, 16 mass % $Al_2O_3$, 4 mass % $Li_2O$, 9 mass % $Na_2O$, 2 mass % MgO and 4 mass % CaO using a known float method.

Next, each of the starting material glass plates was cut simultaneously along the outer peripheral surface and the inner peripheral surface thereof using a hard metal cutter, thus processing each of the starting material glass plates into a donut-shaped glass substrate having an outside diameter of 96 mm and an inside diameter of 24 mm.

Next, grinding of the inner and outer peripheral surfaces and chamfering of angular parts thereof was carried out on each of the glass substrates using grindstones having diamond abrasive grains attached thereto, and then the inner and outer peripheral surfaces including the chamfered parts were mirror-finished by polishing using $CeO_2$ abrasive grains.

Next, a molten salt of temperature 400° C. was prepared by mixing reagent grade 1 sodium nitrate and reagent grade 1 potassium nitrate in a volume ratio of 40:60. The glass substrates were immersed in the molten salt and left for 2 hours, thus carrying out chemical strengthening treatment in which $Li^+$ and $Na^+$ in the glass substrates were replaced through ion exchange with $K^+$, which has a larger ionic radius than $Li^+$ and $Na^+$.

Next, the glass substrates that had been subjected to the chemical strengthening treatment were cooled rapidly by being put into water at room temperature, and then the glass substrates were immersed in water for 30 minutes, thus washing off molten salt attached to the surfaces of the glass substrates.

Next, using loose abrasive grains of mean grain diameter 1.5 μm having $CeO_2$ as a principal component thereof, a slurry was prepared such that the concentration of the polishing agent was 20 mass %, this slurry was fed into a polishing machine, and pre-polishing was carried out. Specifically, urethane foam polishing pads were bonded onto the faces of the polishing machine that were to contact the glass substrate, and the upper and lower surfaces of the glass substrate were simultaneously each subjected to 20 μm of polishing while applying a pressure of 5 $kg/cm^2$. After this, the glass substrates were washed for 5 minutes in pure water while applying 40 kHz ultrasound, thus removing the polishing agent.

Next, using loose abrasive grains of mean grain diameter 0.7 μm having $CeO_2$ as a principal component thereof, a slurry was prepared such that the concentration of the polishing agent was 20 mass %, this slurry was fed into a polishing machine, and precision polishing was carried out. Specifically, urethane foam polishing pads were bonded onto the faces of the polishing machine that were to contact the glass substrate, and precision polishing of the upper and lower surfaces of the glass substrate was carried out while applying a pressure of 2 $kg/cm^2$, with the polishing amount being 1 μm per surface.

Next, surface washing was carried out to increase the degree of cleanliness of the main surfaces (recording surfaces) of each glass substrate. Specifically, acid washing was carried out for 3 minutes at a temperature of 55° C. using a 0.02 mass % hydrofluoric acid aqueous solution while applying 40 kHz ultrasound, and then rinsing was carried out with pure water. After that, alkali washing was carried out for 3 minutes at a temperature of 55° C. using a potassium hydroxide aqueous solution of pH 12 while applying 40 kHz ultrasound. Then, after rinsing with pure water, IPA drying was carried out, thus completing the preparation of the 20 test pieces of Example 1.

Moreover, 20 test pieces of Example 2 were prepared using the same procedure as in Example 1 described above, except that the precision polishing was carried out with a polishing amount of 5 μm per surface.

Furthermore, as comparative examples, 20 test pieces were prepared using the same procedure as in Example 1 described above, except that the precision polishing was carried out with a polishing amount of 0.5 μm per surface (Comparative Example 1), and 20 test pieces were prepared using the same procedure as in Example 1 described above, except that the precision polishing was not carried out (Comparative Example 2).

Next, the average surface roughness Ra (nm) and the bearing height BH04 (nm) were measured using an atomic force microscope for each of the test pieces obtained.

Table 1 shows the measurement results of the average surface roughness Ra and the bearing height BH04 for each of the examples and comparative examples.

TABLE 1

| | Polishing Amount (μm) | Ra(nm) | | | | | BH04(nm) | | | | |
|---|---|---|---|---|---|---|---|---|---|---|---|
| | | Upper Surface | Lower Surface | Overall Mean (Ave) | Deviation Δ | Δ/Ave | Upper Surface | Lower Surface | Overall Mean (Ave) | Deviation Δ | Δ/Ave |
| Examples | | | | | | | | | | | |
| 1 | 1 | 0.408 | 0.390 | 0.399 | 0.018 | 0.045 | 1.550 | 1.500 | 1.525 | 0.050 | 0.033 |
| 2 | 5 | 0.662 | 0.650 | 0.656 | 0.012 | 0.018 | 1.990 | 2.050 | 2.020 | 0.060 | 0.030 |
| 3 | 0 | 0.258 | 0.191 | 0.225 | 0.067 | 0.298 | 0.710 | 0.630 | 0.670 | 0.080 | 0.119 |
| Comparative Examples 1 | 0.5 | 0.551 | 0.446 | 0.499 | 0.105 | 0.211 | 2.000 | 1.670 | 1.835 | 0.330 | 0.180 |

In Table 1, for Comparative Example 2 in which precision polishing was not carried out, the mean value for the upper surface, the mean value for the lower surface, and the overall mean value for the upper and lower surfaces (each is a mean value over the 20 test pieces; hereinafter referred to as "Ave") are all within the ranges specified in the present invention for both the average surface roughness Ra and the bearing height BH04 (Ra: 0.1 nm to 1.5 nm, BH04: 0.5 nm to 5 nm). However, for each of the average surface roughness Ra and the bearing height BH04, the mean variation (Δ/Ave) is large, and hence it was found that, with regard to the individual magnetic disk substrates, magnetic disk substrates are obtained having an average surface roughness Ra and a bearing height BH04 outside the present invention.

Moreover, for Comparative Example 1, compared with Examples 1 and 2, greater differences occurred in the average surface roughness Ra and the bearing height BH04 between the upper surface and the lower surface of the magnetic disk substrates. It is thought that this is because the starting material glass plates were manufactured using a float method, and hence tin became attached to the lower surface of each of the starting material glass plates, and thus greater differences in the average surface roughness Ra and the bearing height BH04 between the upper surface and the lower surface occurred due to the influence of this tin. However, as is apparent from Examples 1 and 2, the larger the polishing amount, the smaller the mean variation (Δ/Ave) for both the average surface roughness Ra and the bearing height BH04, i.e. it becomes possible to obtain magnetic disk substrates having a stable surface shape that differs little between substrates.

Second Examples

Next, disk processing, edge processing, chemical strengthening treatment and pre-polishing were carried out in that order following the same procedure as in the First Examples, and then precision polishing was carried out with the polishing amount being 5 μm for each of the upper and lower surfaces of the glass substrates as in Example 2.

Then, acid washing was carried out using hydrofluoric acid (Examples 11 to 17), sulfuric acid (Example 18), nitric acid (Example 19), hydrochloric acid (Example 20), sulfamic acid (Example 21) or a mixture of sulfuric acid and nitric acid (Example 22) as the acidic aqueous solution, and then alkali washing was carried out using an alkaline aqueous solution having a pH adjusted to not less than 10, specifically potassium hydroxide (Examples 11 to 14, and 18 to 22), sodium hydroxide (Example 15), ammonia (Example 16) or tetramethylammonium hydroxide (Example 17). Next, rinsing was carried out with pure water, and then IPA drying was carried out.

Moreover, as comparative examples, acid washing was carried out using hydrofluoric acid (Comparative Examples 11 and 12) or silicofluoric acid (Comparative Example 13) as the acidic aqueous solution; after that, in Comparative Example 11, alkali washing was carried out using potassium hydroxide of pH 9, then rinsing with pure water was carried out, and then IPA drying was carried out, and in Comparative Examples 12 and 13, after only the above acid washing, rinsing with pure water was carried out, and then IPA drying was carried out (i.e. alkali washing was not carried out). Furthermore, test pieces were also prepared for which only the alkali washing was carried out, this being using potassium hydroxide of pH 12, and acid washing was not carried out (Comparative Example 14).

Next, the surfaces of the substrates for each of the examples and comparative examples prepared as described above were observed using a scanning type probe microscope (Nanoscope IIIa made by Digital Instruments Inc.) in tapping mode, and taking the height at which the bearing ratio BR is 50% as a reference height, the number of projections N having a projection height of 5 nm or more from the reference height in a 50 μm×50 nm region was counted.

Table 2 shows the measurement results of the number of projections N.

TABLE 2

| | Polishing Amount (μm) | Acid Washing | | Alkali Washing | | Number of Projections N of Height 5 nm or more per 50 μm × 50 μm |
|---|---|---|---|---|---|---|
| | | Acidic Aqueous Solution | Concentration (wt %) | Alkaline Aqueous Solution | pH | |
| Examples | | | | | | |
| 11 | 5 | Hydrofluoric Acid | 0.02 | Potassium Hydroxide | 10 | 0 |
| 12 | 5 | Hydrofluoric Acid | 0.02 | Potassium Hydroxide | 12 | 0 |
| 13 | 5 | Hydrofluoric Acid | 0.02 | Potassium Hydroxide | 13 | 0 |
| 14 | 5 | Hydrofluoric Acid | 0.02 | Potassium Hydroxide | 11 | 0 |
| 15 | 5 | Hydrofluoric Acid | 0.02 | Sodium Hydroxide | 12 | 0 |
| 16 | 5 | Hydrofluoric Acid | 0.02 | Ammonia | 11 | 0 |
| 17 | 5 | Hydrofluoric Acid | 0.02 | Tetramethyl-ammonium Hydroxide | 11 | 0 |
| 18 | 5 | Sulfuric Acid | 1 | Potassium Hydroxide | 10 | 0 |
| 19 | 5 | Nitric Acid | 1 | Potassium Hydroxide | 10 | 0 |
| 20 | 5 | Hydrochloric Acid | 1 | Potassium Hydroxide | 10 | 0 |
| 21 | 5 | Sulfamic Acid | 0.5 | Potassium Hydroxide | 10 | 0 |
| 22 | 5 | Sulfuric Acid + Nitric Acid | Sulfuric Acid:0.5 Nitric Acid:0.5 | Potassium Hydroxide | 10 | 0 |
| Comparative Examples | | | | | | |
| 11 | 5 | Hydrofluoric Acid | 0.02 | Potassium Hydroxide | 9 | 15 |
| 12 | 5 | Hydrofluoric Acid | 0.02 | — | — | 17 |
| 13 | 5 | Silicofluoric Acid | 0.35 | — | — | 28 |
| 14 | 5 | — | — | Potassium Hydroxide | 12 | 54 |

For Comparative Example 11, because the pH of the potassium hydroxide used as the alkaline aqueous solution was low at 9, it was not possible to sufficiently remove polishing abrasive grains (foreign matter) attached to the surfaces of the magnetic disk substrates, and hence the number of projections per 50 μm×50 μm having a projection height of 5 nm or more was counted to be 15. Moreover, for Comparative Examples 12 and 13, because only acid washing was carried out, i.e. alkali washing was not carried out, polishing abrasive grains remained attached to the substrates as foreign matter, and as a result the number of projections per 50 μm×50 μm having a projection height of 5 nm or more was counted to be 17 and 28 respectively. Furthermore, for Comparative Example 14, because only alkali washing was carried out and acid washing was not carried out, only a very little etching took place, and hence the surface cleaning ability was poor, and as a result the number of projections per 50 μm×50 μm having a projection height of 5 nm or more was counted to be 54.

In contrast with the above, for Examples 11 to 22, because acid washing was carried out and then alkali washing was carried out using an alkaline aqueous solution of pH 10 or more, the altered layers were removed and also the degree of cleanliness of the surfaces was improved, and hence abnormal projections having a projection height of 5 nm or more from the reference height were not observed at all.

Third Examples

Next, disk processing, edge processing, chemical strengthening treatment and pre-polishing were carried out in that order following the same procedure as in the First Examples, and then precision polishing was carried out with the polishing amount being 5 μm for each of the upper and lower surfaces of the glass substrates as in Example 2.

Then, acid washing was carried out using 0.02 mass % hydrofluoric acid, and then alkali washing was carried out using potassium hydroxide having a pH adjusted to 12.

After that, rinsing was carried out with pure water, and then de-alkalization treatment was carried out. Specifically, some of the glass substrates were immersed in pure water of pH 7 at a temperature of 60° C., and then IPA drying was carried out, thus preparing the test pieces of Example 31. Some of the glass substrates were immersed in sodium hydroxide of pH 11 at 70° C., and then IPA drying was carried out, thus preparing the test pieces of Example 32. Some of the glass substrates were immersed in sulfuric acid of pH 4 at 70° C., and then IPA drying was carried out, thus preparing the test pieces of Example 33. For all of the above examples, the treatment time (immersion time) was 5 minutes. Moreover, for some of the glass substrates, treatment was carried out for 10 minutes in a high-temperature atmosphere at 250° C. using a mixed gas of nitrogen (95 mass %) and sulfur dioxide (5 mass %) as an acidic gas, and then IPA drying was carried out, thus preparing the test pieces of Example 34.

Moreover, for some of the glass substrates, after carrying out the precision polishing, scrub washing was carried out using colloidal silica, and then the surface washing was carried out, thus preparing the test pieces of Example 35. In the scrub washing, a surface pressure of 9800 Pa was applied to two circular suede pads that were displaced relative to the center of the glass substrate being subjected to the scrub washing, thus sandwiching the glass substrate between the suede pads, and then the suede pads were rotated for 15 seconds at 150 rpm while feeding in a colloidal silica slurry at a rate of 20 ml/min from the center of each suede pad, thus polishing the substrate surfaces with the colloidal silica.

Furthermore, as comparative examples, some of the glass substrates were immersed for 5 minutes in pure water of pH 7 at a temperature of 60° C. as the de-alkalization treatment, and then IPA drying was carried out, thus preparing the test pieces of Comparative Example 31. Some of the glass substrates were immersed for 5 minutes in sodium hydroxide of pH 12 at a temperature of 70° C., and then IPA drying was carried out, thus preparing the test pieces of Comparative Example 32. Some of the glass substrates were immersed for 4 or 3 minutes in sulfuric acid of pH 4 at a temperature of 70° C., and then IPA drying was carried out, thus preparing the test pieces of Comparative Examples 33 and 34 respectively.

Moreover, as conventionally, disk processing, edge processing, surface polishing, surface washing (acid washing (hydrofluoric acid, 200 ppm) plus alkali washing (KOH, pH 12)), rinsing in pure water, IPA drying, and chemical strengthening treatment were carried out in this order, then alkali washing was carried out using potassium hydroxide of pH 12 to remove foreign matter by etching, rinsing was carried out in pure water, and IPA drying was carried out, thus preparing the test pieces of Comparative Example 35.

Next, each of the test pieces (Examples 31 to 35, Comparative examples 31 to 35) was left in the air in a clean room for 96 hours, and then the surface shape was observed using an atomic force microscope, and the number of projections N having a projection height of 5 nm or more from the reference height (the height at which the bearing ratio BR is 50%) in a field of view of 50 μm×50 μm was counted.

Table 3 shows the measurement results.

TABLE 3

| | De-Alkalization Treatment | | Number of Projections N |
|---|---|---|---|
| | Treatment Agent | Treatment Condition | of Height 5 nm or more per 50 μm × 50 μm |
| Examples | | | |
| 31 | Pure Water (pH 7) | 70° C., 5 min | 0 |
| 32 | Sodium Hydroxide (pH 11) | 70° C., 5 min | 0 |
| 33 | 0.005 mass % Sulfuric Acid (pH 4) | 70° C., 5 min | 0 |
| 34 | 95% Nitrogen + 5% Sulfur Dioxide | 250° C., 10 min | 0 |
| 35 | (Scrub Washing Using Colloidal Silica) | | 0 |
| Comparative Examples | | | |
| 31 | Pure Water (pH 7) | 60° C., 5 min | 20 |
| 32 | Sodium Hydroxide (pH 12) | 70° C., 5 min | 16 |
| 33 | 0.005 mass % Sulfuric Acid (pH 4) | 70° C., 4 min | 3 |
| 34 | 0.005 mass % Sulfuric Acid (pH 4) | 70° C., 3 min | 12 |
| 35 | (Precision Polishing → Surface Washing → Chemical Strengthening → Alkali Washing) | | 4 |

As is apparent from Table 3, for Comparative Example 31. pure water of pH 7 was used in the de-alkalization treatment, but because the temperature of the pure water was low at 60° C., the de-alkalization treatment could not be carried out sufficiently, and hence the number of prejections N having a projection height of 5 nm or more was high at 20 per 50 μm×50 μm. Moreover, for Comparative Example 32, the test pieces were immersed for 5 minutes in sodium hydroxide at a temperature of 70° C., but because the pH of the sodium hydroxide was high at 12, the de-alkalization treatment could not be carried out sufficiently, and hence the number of projections N having a projection height of 5 nm or more was counted to be 16 per 50 μm×50 μm. Moreover, for Comparative Examples 33 and 34, the test pieces were immersed in sulfuric acid of pH 4 at a temperature of 70° C., but because the treatment time was short at under 5 minutes, specifically 4 minutes and 3 minutes respectively, abnormal projections having a projection height of 5 nm or more were observed. For Comparative Example 35, because alkali washing was carried out after the chemical strengthening treatment, alkaline components leached out and hence it was observed that abnormal projections were formed.

In contrast with the above, for Examples 31 to 33, immersion was carried out for 5 minutes in a 70° C. high-temperature liquid of pH not more than 11, and moreover for Example 34, the treatment was carried out using a high-temperature acidic gas. The desired de-alkalization treatment could thus be carried out. As a result, the formation of surface projections due to leaching out of alkaline components was suppressed, and hence abnormal projections having a projection height of 5 nm or more were not observed. Moreover, for Example 35, scrub washing was carried out using a colloidal silica slurry, and hence it was found that projections that would act as nuclei for crystallization of alkaline components that leached out to the surfaces were not produced.

Fourth Examples

Next, treatment was carried out for 10 minutes in high-temperature pure water of pH 7 and temperature 90° C. or 70° C. as the de-alkalization treatment, thus preparing the test pieces of Examples 41 and 42, and then the amount of $R_2O$ (R=Li, Na, K) leached out was measured. Moreover, instead of the de-alkalization treatment, substrates that had not been subjected to chemical strengthening treatment (Comparative example 41), substrates that had been subjected to chemical strengthening treatment (Comparative example 42) and substrates that had been subjected to chemical strengthening treatment and then to precision polishing (polishing amount 10 μm) (Comparative Example 43) were left for 24 hours in an 80° C. atmosphere, and then the amount of $R_2O$ leached out was similarly measured.

Figure 7:
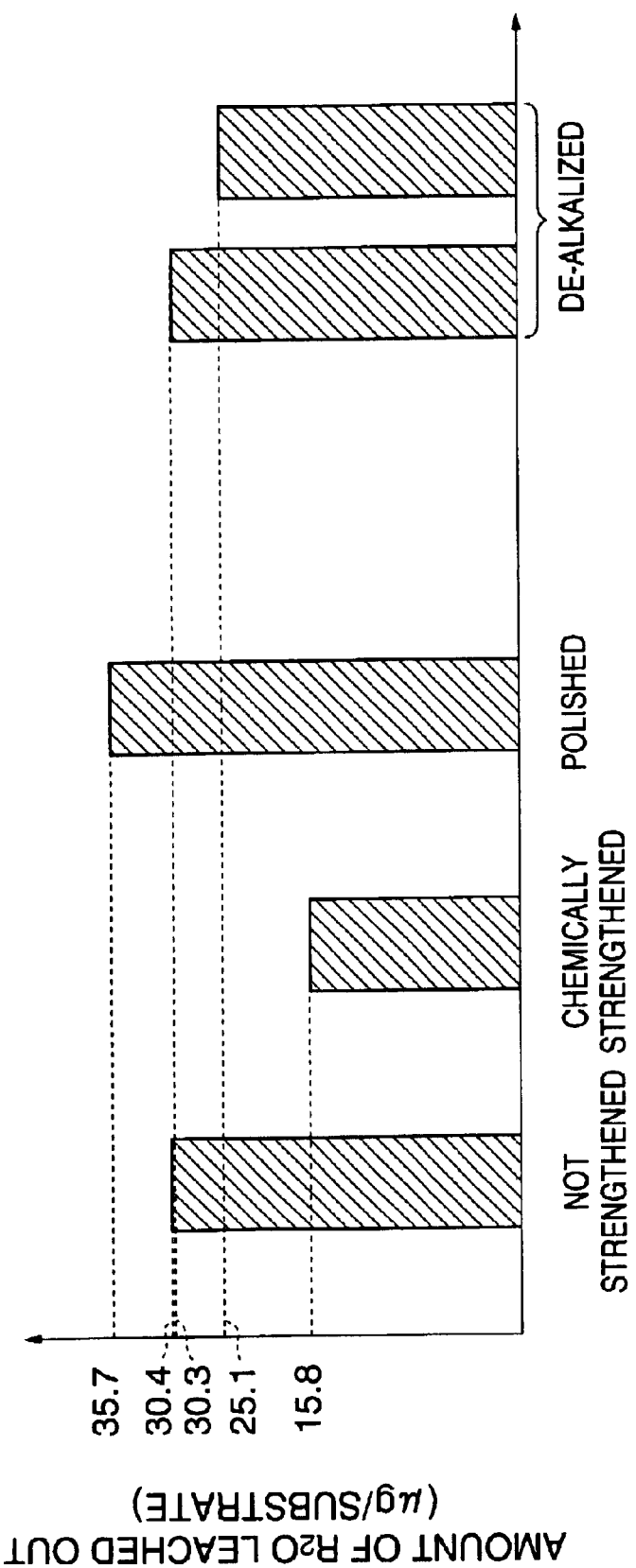
FIG. 7 is a bar chart showing measurement results of amount of $R_2O$ leached out (R=Li, Na, K)
Figure 8:
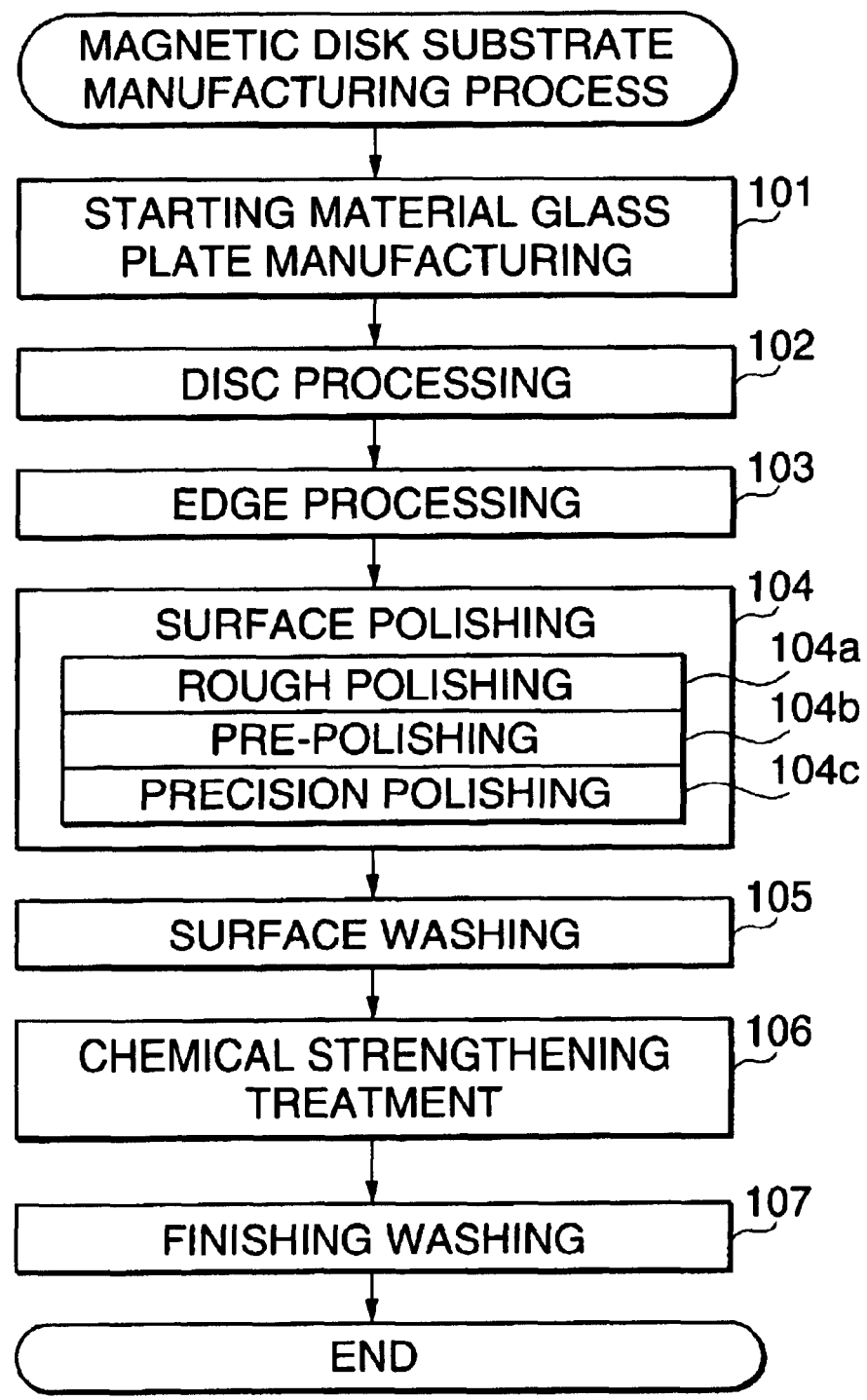
FIG. 8 is a flowchart showing a conventional method of manufacturing a magnetic disk substrate.

Table 4 shows the measurement results, and FIG. 7 is a bar chart of the measurement results.

TABLE 4

| | De-Alkalization Treatment | Amount Leached Out (μg/Substrate) | | | |
|---|---|---|---|---|---|
| | | $Li_2O$ | $Na_2O$ | $K_2O$ | Total $R_2O$ |
| Examples | | | | | |
| 41 | Pure Water, 90° C., 10 min | 4.3 | 20.8 | 0 | 25.1 |
| 42 | Pure Water, 70° C., 10 min | 5.8 | 24.6 | 0 | 30.3 |

TABLE 4-continued

| | De-Alkalization Treatment | Amount Leached Out (μg/Substrate) | | | |
|---|---|---|---|---|---|
| | | $Li_2O$ | $Na_2O$ | $K_2O$ | Total $R_2O$ |
| Comparative Examples | | | | | |
| 41 | (Not Chemically Strengthened) | 9.0 | 20.6 | 0.8 | 30.4 |
| 42 | (Chemically Strengthened) | 4.9 | 7.1 | 3.8 | 15.8 |
| 43 | (Chemically Strengthened then Precision Polished) | 5.6 | 28.9 | 1.2 | 35.7 |

As is apparent from Table 4 and FIG. 7, by carrying out chemical strengthening treatment, the substrates are strengthened and hence the amount of $R_2O$ leached out is reduced, but if the strengthened layer formed through the chemical strengthening treatment is subsequently removed by precision polishing, then the amount of $R_2O$ leached out after the precision polishing is higher than before the chemical strengthening treatment, leading to a deterioration in weather resistance. However, by carrying out de-alkalization treatment after the precision polishing, the amount of $R_2O$ leached out can be reduced at least to about that before chemical strengthening treatment, and hence the weather resistance can be improved.

What is claimed is:

1. A method of manufacturing a substrate for information recording media, comprising the steps of:
    carrying out a chemical strengthening treatment on a glass substrate that has been prepared by processing a sheet-shaped starting material glass plate into a predetermined shape;
    carrying out precision polishing on the glass substrate that has been subjected to said chemical strengthening treatment, such that a polishing amount in a thickness direction of the glass substrate is within a predetermined range; and
    carrying out surface washing on the glass substrate that has been subjected to said precision polishing.

2. The method of manufacturing a substrate for information recording media as claimed in claim 1, wherein a polishing agent having a mean grain diameter in a range of 0.1 μm to 1.7 μm is used in said precision polishing.

3. The method of manufacturing a substrate for information recording media as claimed in claim 2, wherein the predetermined range for the polishing amount in said precision polishing is 1 μm to 75 μm.

4. The method of manufacturing a substrate for information recording media as claimed in claim 3, wherein the polishing amount in said precision polishing is not more than 25 μm.

5. The method of manufacturing a substrate for information recording media as claimed in claim 2, wherein the polishing amount in said precision polishing is not less than 3 μm.

6. The method of manufacturing a substrate for information recording media as claimed in claim 5, wherein the polishing amount in said precision polishing is not more than 25 μm.

7. The method of manufacturing a substrate for information recording media as claimed in claim 1, wherein the predetermined range for the polishing amount in said precision polishing is 1 μm to 75 μm.

8. The method of manufacturing a substrate for information recording media as claimed in claim 7, wherein the polishing amount in said precision polishing is not less than 3 μm.

9. The method of manufacturing a substrate for information recording media as claimed in claim 8, wherein the polishing amount in said precision polishing is not more than 25 μm.

10. The method of manufacturing a substrate for information recording media as claimed in claim 7, wherein the polishing amount in said precision polishing is not more than 25 μm.

11. The method of manufacturing a substrate for information recording media as claimed in claim 1, wherein said surface washing comprises carrying out acid washing using an acidic aqueous solution, and then carrying out alkali washing using an alkaline aqueous solution.

12. The method of manufacturing a substrate for information recording media as claimed in claim 11, wherein the acidic aqueous solution contains at least one acid selected from the group consisting of hydrofluoric acid, sulfuric acid, sulfamic acid, hydrochloric acid, nitric acid, and phosphoric acid.

13. The method of manufacturing a substrate for information recording media as claimed in claim 12, wherein the alkaline aqueous solution has a pH of not less than 10.

14. The method of manufacturing a substrate for information recording media as claimed in claim 13, wherein the alkaline aqueous solution contains at least one alkali selected from the group consisting of potassium hydroxide, sodium hydroxide, ammonia, and tetramethylammonium hydroxide.

15. The method of manufacturing a substrate for information recording media as claimed in claim 13, further comprising the step of carrying out a de-alkalization treatment, after carrying out said alkali washing.

16. The method of manufacturing a substrate for information recording media as claimed in claim 15, wherein a high-temperature solution of pH not more than 11 is used in said de-alkalization treatment.

17. The method of manufacturing a substrate for information recording media as claimed in claim 16, wherein the high-temperature solution is at a temperature of not less than 70° C., and said de-alkalization treatment is carried out for a time of not less than 5 minutes.

18. The method of manufacturing a substrate for information recording media as claimed in claim 15, wherein a high-temperature acidic gas is used in said de-alkalization treatment.

19. The method of manufacturing a substrate for information recording media as claimed in claim 1, further comprising a step of carrying out a scrub washing using polishing abrasive grains, between said precision polishing and said surface washing.

20. The method of manufacturing a substrate for information recording media as claimed in claim 19, wherein the polishing abrasive grains comprise a colloidal silica slurry.

21. A substrate for information recording media manufactured by the method as claimed in claim 1, the substrate for information recording media having an average surface roughness Ra in a range of 0.1 nm to 1.5 nm, and a bearing height BH04 in a range of 0.5 nm to 5 nm.

22. An information recording medium comprising a substrate for information recording media as claimed in claim 21, and an information recording layer formed on at least one surface thereof.

23. A method of manufacturing a substrate for information recording media, comprising the steps of:

carrying out a surface polishing treatment on a donut-shaped glass substrate;

carrying out a chemical strengthening treatment on the glass substrate;

carrying out a precision polishing treatment on the glass substrate that has been subjected to said chemical strengthening treatment, such that a polishing amount in a thickness direction of the glass substrate is within a predetermined range; and carrying out a surface washing treatment on the glass substrate that has been subjected to said precision polishing, wherein said surface washing treatment comprises an etching treatment.

24. The method of manufacturing a substrate for information recording media as claimed in claim 23, wherein the substrate for information recording media has an average surface roughness Ra in a range of 0.1 nm to 1.5 nm, and a bearing height BH04 in a range of 0.5 nm to 5 nm.

25. The method of manufacturing a substrate for information recording media as claimed in claim 23, wherein the glass substrate that has been subjected to said precision polishing treatment has a strengthened layer remaining thereon.

26. A substrate for information recording media manufactured using a method as claimed in claim 23, the substrate having an information recording layer formed on at least one surface thereof.

* * * * *

UNITED STATES PATENT AND TRADEMARK OFFICE
CERTIFICATE OF CORRECTION

PATENT NO. : 7,040,953 B2  Page 1 of 1
APPLICATION NO. : 10/205073
DATED : May 9, 2006
INVENTOR(S) : Kensuke Matsuno et al.

It is certified that error appears in the above-identified patent and that said Letters Patent is hereby corrected as shown below:

On Title Page item 56 should read

| | | | |
|---|---|---|---|
| 6,568,995 B1 | 5/2003 | Mitani et al. | 451/36 |
| 2001/0024932 A1 | 9/2001 | Shimada | 451/41 |
| 2002/0108400 A1 | 8/2002 | Watanabe et al. | |
| 2003/0003763 A1 | 1/2003 | Kurachi et al. | |
| 2002/0197437 A1 | 12/2002 | Hashimoto et al. | |
| 2003/0110803 A1 | 6/2003 | Saito et al. | |

Signed and Sealed this

First Day of April, 2008

JON W. DUDAS
*Director of the United States Patent and Trademark Office*